United States Patent
Johansson et al.

(10) Patent No.: US 8,422,382 B2
(45) Date of Patent: Apr. 16, 2013

(54) METHOD AND ARRANGEMENT FOR ADAPTING TRANSMISSION OF ENCODED MEDIA

(75) Inventors: Ingemar Johansson, Luleå (SE); Tomas Frankkila, Luleå (SE); Jonas Svedberg, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 480 days.

(21) Appl. No.: 12/438,443

(22) PCT Filed: May 28, 2007

(86) PCT No.: PCT/SE2007/050364
§ 371 (c)(1),
(2), (4) Date: Feb. 23, 2009

(87) PCT Pub. No.: WO2008/024056
PCT Pub. Date: Feb. 28, 2008

(65) Prior Publication Data
US 2010/0232297 A1    Sep. 16, 2010

Related U.S. Application Data

(60) Provisional application No. 60/838,885, filed on Aug. 21, 2006.

(51) Int. Cl.
*G06F 11/00*    (2006.01)

(52) U.S. Cl.
USPC .......................... 370/252; 370/241; 370/465

(58) Field of Classification Search .................. 370/241, 370/252, 465
See application file for complete search history.

(56) References Cited

U.S. PATENT DOCUMENTS

| | | | | |
|---|---|---|---|---|
| 5,490,168 | A * | 2/1996 | Phillips et al. | 375/224 |
| 6,584,190 | B1 * | 6/2003 | Bressler | 379/230 |
| 7,689,162 | B2 * | 3/2010 | Thesling | 455/3.02 |
| 2002/0131415 | A1 * | 9/2002 | Guven et al. | 370/394 |
| 2005/0107036 | A1 * | 5/2005 | Song et al. | 455/23 |
| 2007/0147314 | A1 * | 6/2007 | Taleb et al. | 370/338 |
| 2007/0189212 | A1 * | 8/2007 | Awad et al. | 370/328 |

FOREIGN PATENT DOCUMENTS
WO        WO 9602096 A1    1/1996

\* cited by examiner

*Primary Examiner* — Jason Mattis

(57) ABSTRACT

The present invention is to select an adaptation scheme for the transmission of the encoded media that results in a satisfactory performance of the transmitted encoded media. A difference from the prior art is that each adaptation scheme defines a set of different transmission formats, wherein each transmission formats is a combination of at least two of the parameters the source codec bit rate, the packet rate, the number of frames of each packet (referred to as frame aggregation), and the level of redundancy. By using the different transmission formats, the transmission can be adapted to different operating scenarios and the performance is hence improved.

33 Claims, 12 Drawing Sheets

| Format | Source coding bit rate | Redundancy bit rate | Packetization | Purpose with this scheme |
|---|---|---|---|---|
| 1 | 12.2 kbps | 0 kbps | 1 original frame per packet | Normal format when channel conditions are good and when network load is low |
| 2 | 7.4 kbps | 0 kbps | 1 original frame per packet | Offers some back-off in bit rate compared to scheme 1 |
| 3 | 5.9 kbps | 0 kbps | 1 original frame per packet | Offers some more back-off in bit rate compared to scheme 1 and 2 |
| 4 | 5.9 kbps | 0 kbps | 2 original frames per packet | Packing 2 speech frames per packet gives a back-off in packet rate |
| 5 | 5.9 kbps | 5.9 kbps | 1 original frame and 1 redundant frame per packet | 100% redundancy increases the resilience against packet losses |
| 6 | 4.75 kbps | 2*4.75 kbps | 1 original frame and 2 redundant frames per packet | 200% redundancy increases the resilience even further than scheme 5 |
| 7 | 4.75 kbps | 2*4.75 kbps with offset | 1 original frame and 2 redundant frames per packet, NO_DATA frames inserted between the speech frames | The high level of redundancy, in combination with the offset, gives a good resilience against packet losses that occur in bursts |

Fig. 1; Table 1

| Packet number | Frame number | | | | | | | |
|---|---|---|---|---|---|---|---|---|
| | M | M+1 | M+2 | M+3 | M+4 | M+5 | M+6 | M+7 |
| N | AMR 122 | | | | | | | |
| N+1 | | AMR 122 | | | | | | |
| N+2 | | | AMR 122 | | | | | |
| N+3 | | | | AMR 122 | | | | |
| N+4 | | | | | AMR 122 | | | |
| N+5 | | | | | | AMR 122 | | |
| N+6 | | | | | | | AMR 122 | |

Fig. 2; Table 2

|   | Frame number | | | | | | | |
| --- | --- | --- | --- | --- | --- | --- | --- | --- |
| Packet number | M | M+1 | M+2 | M+3 | M+4 | M+5 | M+6 | M+7 |
| N | AMR59 | AMR59 | | | | | | |
| N+1 | | | AMR59 | AMR59 | | | | |
| N+2 | | | | | AMR59 | AMR59 | | |
| N+3 | | | | | | | AMR59 | AMR59 |

Fig. 3; Table 3

| Packet number | Frame number | | | | | | | |
|---|---|---|---|---|---|---|---|---|
| | M | M+1 | M+2 | M+3 | M+4 | M+5 | M+6 | M+7 |
| N | AMR59 | AMR59 | | | | | | |
| N+1 | | AMR59 | AMR59 | | | | | |
| N+2 | | | AMR59 | AMR59 | | | | |
| N+3 | | | | AMR59 | AMR59 | | | |
| N+4 | | | | | AMR59 | AMR59 | | |
| N+5 | | | | | | AMR59 | AMR59 | |
| N+6 | | | | | | | AMR59 | AMR59 |

Fig. 4; Table 4

| Packet number | Frame number | | | | | | | |
| --- | --- | --- | --- | --- | --- | --- | --- | --- |
| | M | M+1 | M+2 | M+3 | M+4 | M+5 | M+6 | M+7 |
| N | AMR 475 | AMR 475 | AMR 475 | | | | | |
| N+1 | | AMR 475 | AMR 475 | AMR 475 | | | | |
| N+2 | | | AMR 475 | AMR 475 | AMR 475 | | | |
| N+3 | | | | AMR 475 | AMR 475 | AMR 475 | | |
| N+4 | | | | | AMR 475 | AMR 475 | AMR 475 | |
| N+5 | | | | | | AMR 475 | AMR 475 | AMR 475 |

Fig. 5; Table 5

| Packet number | Frame number | | | | | | | | | | |
|---|---|---|---|---|---|---|---|---|---|---|---|
| | M | M+1 | M+2 | M+3 | M+4 | M+5 | M+6 | M+7 | M+8 | M+9 | M+10 |
| N | AMR 475 | NO_DATA | AMR 475 | NO_DATA | AMR 475 | | | | | | |
| N+1 | | AMR 475 | NO_DATA | AMR 475 | NO_DATA | AMR 475 | | | | | |
| N+2 | | | AMR 475 | NO_DATA | AMR 475 | NO_DATA | AMR 475 | | | | |
| N+3 | | | | AMR 475 | NO_DATA | AMR 475 | NO_DATA | AMR 475 | | | |
| N+4 | | | | | AMR 475 | NO_DATA | AMR 475 | NO_DATA | AMR 475 | | |
| N+5 | | | | | | AMR 475 | NO_DATA | AMR 475 | NO_DATA | AMR 475 | |
| N+6 | | | | | | | AMR 475 | NO_DATA | AMR 475 | NO_DATA | AMR 475 |

Fig. 6; Table 6

METHOD AND ARRANGEMENT FOR ADAPTING TRANSMISSION OF ENCODED MEDIA

This application claims the benefit of U.S. Provisional Application No. 60/838,885, filed Aug. 21, 2006, the disclosure of which is fully incorporated herein by reference.

TECHNICAL FIELD

The present invention relates to a method and an arrangement for transmission of encoded media, and in particular to a solution for adapting the transmission to different operating conditions.

BACKGROUND

In Internet Protocol (IP) systems, especially wireless IP systems such as High Speed Packet Access (HSPA) (i.e. enhanced uplink and High speed data packet access), the services must work on a wide range of operating conditions. The operating conditions depend on a number of factors:

The access type that is used, such as HSPA, Dedicated Channel (DCH) bearers, Enhanced Data Rates for GSM Evolution (EDGE), etc.

The channel conditions for the current user, i.e. if the user has good or bad channel conditions.

The current cell load in the system.

The traffic mixture, i.e. if all users are, for example, using Voice over IP (VoIP) or if there is a mixture of VoIP users, video telephony users and users doing web surfing or file transfer.

Specifically for HSPA, different schedulers give very different performance for different users.

System load. At high load situations routers drop packets as queues get full.

All these different operating conditions result in different performance problems and they require different adaptations in order to improve the quality of a VoIP session.

For circuit switched (CS) voice with Adaptive MultiRate (AMR), it is possible to adapt the speech codec (also referred to as source codec) bit rate and the channel coding bit rate so that:

For good channel conditions, an AMR mode with a high bit rate, for example AMR122, which allows for a quite small amount of channel coding, may be used. This gives the highest quality but makes it less resilient to channel errors.

For poor channel conditions, an AMR mode with a low bit rate, for example AMR475, which allows for extensive channel coding, may be used. This improves the resilience against channel errors while sacrificing some clean channel performance.

For channel conditions in-between these extremes, an AMR mode with medium bit rate, for example AMR74, which allows quite a lot of channel coding, may be used.

In CS systems such as GSM, W-CDMA the sum of speech coding bits and channel coding bits is constant. This is however not necessarily the case for PS systems. Further, for CS systems, adapting the bit rates of the source coding and channel coding therefore allows for maximizing the speech quality for good channel conditions and maximizing the resilience for poor channel conditions.

For IP systems, adapting the bit rate may or may not change the amount of channel coding, depending on the design of the IP system. For example:

Some IP systems may adapt the channel coding in a similar way as CS systems do.

Some IP systems may always add a fixed amount of channel coding, or a fixed modulation scheme. If, for example, the channel coding is fixed, for example a rate 1/2 channel code, then the size of the transmitted block is always proportional to the size of the data packet that is being transmitted.

Some IP systems may have a fixed channel coding but may allow for sending several packets in the same transmission block, if the channel conditions are good enough.

Some IP systems, such as HSPA, may adapt both the amount of channel coding and the number of IP packets that are packed into one transmission block.

It should be clear that, for IP systems, adapting the source codec (such as selecting an AMR mode) and channel codec bit rates works for some operating scenarios and some operating conditions but not for all of them. Bit rate adaptation works not so well when the system is packet rate limited. There is also a general trend in the industry to move towards separating the source coding from the channel coding. In this case, reducing the bit rate, which gives smaller IP packets, but this does not necessarily mean that more channel coding (=error protection) is automatically applied.

VoIP also have to work for different combinations of access methods. One user can for example use HSPA while the other user in the session may for example use EDGE, Telecoms & Internet converged Services & Protocols for Advanced Networks (TISPAN), Generic Access network (GAN)/Wireless Local Area Network (WLAN) or a type of Digital Subscriber Line (xDSL) network. These access methods have different properties and one adaptation scheme that is designed (or optimized) for one specific access method may not work equally well for another access method.

To further complicate the problem, different systems have different capabilities, which enable adaption in different ways. Some examples of capabilities are:

The flexibility in modulation schemes and channel coding.

The smallest and largest possible transmission block sizes are different for different systems.

Some IP systems allow for transmitting several IP packets in one transmission block, other IP systems might not allow this.

There may be other capabilities that are different for different systems.

An additional problem is that the VoIP application may not know what access type that it is being used. VoIP applications implemented in a cellular phone might be aware of the access type, but if the VoIP application is implemented in a PC (laptop), which uses the cellular phone is used as a modem, then the required signaling between the VoIP application and the cellular phone to exchange this information may not exist. To simplify the implementation, it may also be desired to separate the source coding from the transmission. In any case, the VoIP client will only know about its own access type. It is unlikely that signaling will be added to inform a first client of the access type that a second client is using.

SUMMARY

It is therefore an object of the present invention to achieve a solution that does not require knowledge about the access type.

That is achieved by selecting an adaptation scheme for the transmission of the encoded media that results in a satisfactory performance of the transmitted encoded media. In accordance with the present invention each adaptation scheme defines a set of different transmission formats, wherein each transmission formats is a combination of at least two of the characteristics: the source codec bit rate; the packet rate, which is related to the number of frames that are encapsulated in each packet (referred to as frame aggregation); the level of redundancy; and amount of offset used for redundancy. By using the different transmission formats, the transmission can be adapted to different operating conditions and the performance is hence improved.

Thus according to a first aspect, the present invention relates to a method for adapting transmission of encoded media in a packet-switched network to different operating conditions, where a plurality of transmission formats are available. Each transmission format defines a combination of at least two characteristics; frame aggregation, bit rate, and redundancy. It should be noted that it is obvious for a person skilled in the art that frame aggregation can be replaced by packet rate, wherein the packet rate is inverse proportional to the frame aggregation. The method comprises the step of: receiving information whether a performance metric of the transmitted encoded media fulfils a pre-determined target, if the performance metric of the transmitted encoded media does not fulfil the pre-determined target the method comprises the further step of selecting another transmission format of the available transmission formats until the performance metric of the transmitted encoded media fulfils the pre-determined target.

According to a second aspect, the present invention relates to an arrangement for adapting transmission of encoded media in a packet-switched network to different operating conditions, where a plurality of transmission formats are available. Each transmission format defines a combination of at least two characteristics; frame aggregation, bit rate, and redundancy. The arrangement comprises an adaptation controller configured to receive information whether a performance metric of the transmitted encoded media fulfils a pre-determined target, and to evaluate the performance of the received media based on the pre-determined target and to select another transmission format if the performance metric of the transmitted encoded media does not fulfil the pre-determined target.

An advantage with the present invention is that the use of different transport formats improves the performance.

A further advantage is that by having different adaptation mechanisms, the solution is robust against different systems, different combinations of systems and different implementations.

An advantage with one embodiment is that a solution for upwards adaptation is also achieved.

BRIEF DESCRIPTION OF THE DRAWINGS

FIG. 1 shows table 1 exemplifying transmission formats labeled 1-7 that can be tested in one adaptation scheme.

FIG. 2 shows table 2 exemplifying the transmission format corresponding to transmission format number 1 of table 1.

FIG. 3 shows table 3 exemplifying the transmission format corresponding to transmission format number 4 of table 1.

FIG. 4 shows table 4 exemplifying the transmission format corresponding to transmission format number 5 of table 1.

FIG. 5 shows table 5 exemplifying the transmission format corresponding to transmission format number 6 of table 1.

FIG. 6 shows table 6 exemplifying the transmission format corresponding to transmission format number 7 of table 1.

DETAILED DESCRIPTION

Figure 7:
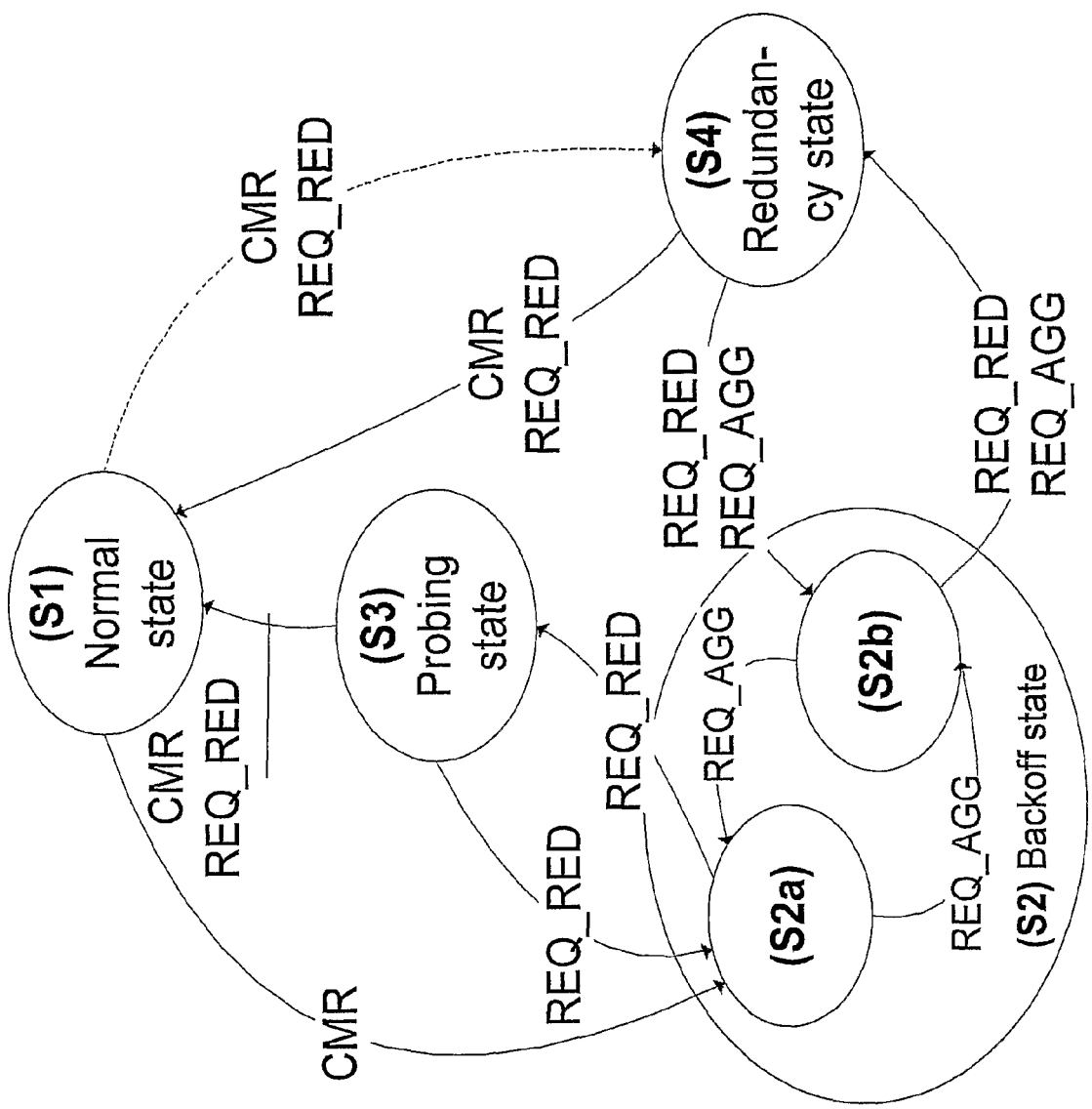
FIG. 7 shows a flowchart of possible transitions between different states according to one embodiment of the present invention.

The main focus of the existing media adaptation solutions is to reduce the bit rate and in particular to adapt downwards, i.e. to adapt to a poorer condition by reducing the bit rate. Since for IP transport, reducing the bit-rate does not automatically mean that more channel coding (=error protection) is used, the existing solutions do not necessarily increase error robustness/error resilience when needed.

Further, there are no mechanisms in the prior art, that enables upwards adaptation and ensures that the media quality is not degraded while trying to adapt upwards.

The basic idea of the present invention is to select an adaptation scheme for the transmission of the encoded media that results in a satisfactory performance of the transmitted encoded media. A difference from the prior art is that each adaptation scheme defines a set of different transmission formats, wherein each transmission formats is a combination of at least two of the characteristics: the source codec bit rate; the packet rate, which is related to the number of frames that are encapsulated in each packet (referred to as frame aggregation); the level of redundancy; and amount of offset used for redundancy. By using the different transmission formats, the transmission can be adapted to different operating conditions and the performance is hence improved.

Note, that the term operating scenario relates in this specification to the systems and nodes that are used in the session. For example, one client uses HSPA; the other client uses EDGE; and they communicate via HSPA, IP backbone network and EDGE (and vice versa). The term operating condition implies in this specification the channel conditions for the different wireless access types and the network load for backbone network. This can be expressed in several ways. For example:
  the channel to interference ratio (C/I) for the respective wireless access network; or:
  the block error rate (BLER) or the packet loss rate (PLR) for the wireless access network; or:
  the packet loss rate for the backbone network; or:
  the system load level (in principle the number of users).

A new transmission format out of a set of available transmission formats may be selected and tested in accordance with the present invention. The new transmission format may be selected when it is detected that the performance is insufficient, but it should be noted that a new transmission format may also be selected and tested independently of the current performance. If the performance of the new transmission format is acceptable, then continue with this transmission format, otherwise try with a further transmission format until a transmission format is found that results in an acceptable performance. If it is not possible to find an acceptable transmission format, then there is a "fall-back" adaptation scheme, referred to as a fall-back transmission format that gives a maximum resilience implying the transport format that offers the largest amount of robustness against packet losses. It is typically the format that has the largest amount of redundancy. It is often required to define an upper limit for the allowed redundancy. This is because of two reasons:

1) A lot of redundancy means an increase of the cell load since the speech codec can only reduce the bit rate of the source coding to a certain amount.
2) Redundancy introduces delay and for real-time services there is an upper limit for the delay from a practical point of view.

As stated above, one adaptation scheme comprises a set of transmission formats. The different transmission formats may be tested in a pre-determined order, wherein the order may depend on the characteristic of the transmission errors, or the order may depend on a target that determines the acceptable performance.

An acceptable performance of the transmission scheme implies that the performance of the selected transmission scheme is above a certain target, e.g. in terms packet loss rate or frame erasure rate or that the performance of the new transmission scheme is better than a previous transmission scheme.

In accordance with one embodiment, a mechanism is included for testing if it is possible to go back to a previously used transmission format. This is done by "probing" (i.e. to try if the performance will be acceptable if a less resilient transmission format is used) which will be further described below. The probing may be achieved by increasing the bit rate by adding redundant information and then evaluating the packet loss rate.

The various performance problems for the different operating scenarios and an outline of an appropriate way to adapt to the operating scenario by selecting the appropriate transmission format for each one, and the order of the appropriate transmission formats, will now be exemplified to give a better understanding of the embodiments of the present invention.

Operating Scenario 1: HSPA with VoIP Users, having High Load, where the Scheduler is Optimized for VoIP:

It is likely that some users will experience high packet loss rates when the system load is increased. A scheduler optimized for VoIP should however ensure that the packet losses are distributed fairly well and that long packet loss bursts are avoided.

In this case, the appropriate actions may be (in order):
1. Reduce codec bit rate.
2. Add redundancy, consecutive packets, maintain reduced codec bit rate.
3. Use frame aggregation, maintain reduced codec bit rate.

These actions may be applied by using the transport formats shown in table 1 of FIG. 1. In step 1, one may switch from transmission format 1 to 2 and then to transmission format 3 if the transmission format 2 is not sufficient. In some cases, one might have to switch directly from transmission format 1 to 3. In step 2, the transport formats 5, 6 and 7 may be used in the indicated order. Further, step 3 corresponds to the use of transmission format 4.

Operating Scenario 2: HSPA with VoIP Users, having High-Load, where the Scheduler is not Optimized for VoIP.

If the scheduler is not optimized for VoIP, for example a Max-CQI or a proportional fair scheduler, then it is likely that a substantial number of long packet loss bursts are present.

In this case, the appropriate actions may be (in order):
1. Reduce codec bit rate.
2. Add redundancy with offset, maintain reduced codec bit rate. Redundancy with offset implies that the redundant bits is not inserted subsequently, instead they are spread out in the packet, which results in that this works well in a bursty environment.
3. Maintain reduced codec rate but turn off redundancy Operating Scenario 3. HSPA with VoIP Users and Poor Channel Conditions.

When the channel conditions are poor, a solution is to first reduce the size of the transmission blocks.

In this case, the appropriate actions may be (in order):
1. Reduce codec bit rate.
2. Maintain reduced codec rate and add redundancy.
3. Maintain reduced codec rate and add redundancy with an offset.

Operating Scenario 4. EDGE

It may not always be possible to add redundancy in EDGE, since EDGE has multiple "coding schemes" or bit rates. The operator can configure the system to only allow, for example, the coding schemes with the 2-3 lowest bit rates. In this case, there is typically no room for adding redundancy. However, an operator may also allow the higher bit rate coding schemes. In this case, it is possible to use a limited amount of redundancy.

In this case, the appropriate actions may be (in order):
1. Reduce codec bit rate
2. Apply frame aggregation

TISPAN

Land-line IP networks can either be bit rate limited or packet rate limited. When the network is bit rate limited, the appropriate actions are the same as for HSPA with a VoIP optimized scheduler. When the network is packet rate limited, the appropriate actions are the same as for WLAN as described below.

WLAN

Since WLAN is typically packet rate limited, the best solution is to use frame aggregation when the channel conditions deteriorates.

In this case, the appropriate actions may be (in order):
1. Apply frame aggregation.
2. Reduce codec bit rate
3. Add redundancy.

As described above, one adaptation scheme includes several transmission formats where each transmission format is a specific combination of:

Source coding bit rate, i.e. AMR codec mode.
Packetization, i.e. the number of frames encapsulated in each packet.
Redundancy level, i.e. how many times a frame is transmitted (in different packets).
Redundancy offset, i.e. if "dummy" frames are inserted in-between the frames that are encapsulated in each packet. A dummy frame is a frame that contains no relevant data, but it must contain some data such that it is possible to identify the frame as a dummy frame.

The tested transmission formats are typically sorted and tested in some order. Table 1 in FIG. 1 describes an example of how such transmission formats denoted 1-7 may be constructed.

It is possible to design other transmission formats with varying degree of back-off and resilience. Back-off is reduction of bit rate (i.e. to go from AMR 12.2 kbps to AMR 5.9 kbps) or packet rate (i.e. to go from 50 packets/second to 25).

Resilience is a generic terminology that describes how robust a transport format is against packet losses. "Resilience" is often used when one talk about robustness without exactly quantifying how robust it is. Examples:
Scheme 1=1 frame/packet, no redundancy
Scheme 2=2 frames/packet, 100% redundancy (each frame is transmitted twice)

With a packet loss rate of 10%, scheme 1 gives a frame erasure rate of 10% but scheme 2 gives a frame erasure rate of about 1% (depending of how well the packet losses are distributed).

The different transmission formats 1-7 shown in table 1 of FIG. 1 are clarified in the tables shown in FIGS. 2-6.

Table 2 of FIG. 2 shows the transmission format 1 of table 1. In the transmission format shown in table 2, each speech frame is transmitted only once and in individual packets. Thereby, a packet loss corresponds to a frame loss. Transmission formats 2 and 3 are similar, except that the speech codec mode is reduced to AMR74 and AMR59 respectively. Transmission formats 2 and 3 thereby provide a back-off in bit rate which reduces the load of the system.

The transmission format corresponding to the transmission format 4 of table 1 shown in table 3 of FIG. 3 reduces the packet rate from 50 packets per second to 25. This is beneficial since the IP, UDP and RTP packet overhead is reduced since the overhead of each packet is shared by two frames. The drawback is however that one looses two speech frames for every packet that is lost.

In the transmission format corresponding to the transmission format 5 of table 1 shown in table 4 of FIG. 4, redundancy has been added. This makes it possible to recover all speech frames for any case of single packet losses since each speech frame is transmitted twice but in different packets. For example, if packet N+3 is lost then frame M+3 is found in packet N+2 and frame M+4 is found in packet N+4. If one looses 2 packets in-a-row, then one will loose one speech frame. The drawback is however that some delay is added. Also, since each frame is transmitted twice, it is important to reduce the source coding bit rate in order to not load the system any more than what is done in transmission format number 1.

The transmission format corresponding to the transmission format 6 of FIG. 1 shown in table 5 of FIG. 5 is similar to the transmission format in table 4 with the exceptions that a lower codec mode rate is used and that all speech frames are transmitted three times in different packets. Thereby, it is possible to recover all speech files even if two packets are lost in-a-row.

The transmission format corresponding to the transmission format 7 of table 1 is shown in table 6 of FIG. 6. This transmission format increases the resilience against even longer packet loss bursts since the redundant frames are added with an offset without the need to add too much extra overhead (the NO_DATA frames increases the packet sizes only marginally). The drawback is however that even more delay is added.

The NO_DATA frames shown in table 6 are "dummy" (or empty) frames that are needed to fill out the space in-between the speech frames in the RTP payload. The necessity to use dummy frames depends on the payload format. For the AMR payload format, it is necessary to use these dummy frames since the frames that are encapsulated in the payload must be consecutive. Other payload formats may provide functionality to avoid the dummy frames.

It should be obvious that the transmission formats can be varied in infinity and other alternatives of the transmission formats are obvious for a skilled person.

In order to verify that a transmission format that is being tested performs well, a target for the media performance when the transmission format is being used may be defined. The adaptation target may be an absolute target, or a relative target. This target is preferably different for different operating conditions and may also depend on the chosen performance metrics:

If the main problem is packet losses and if the packet losses are distributed fairly well over time (non-consecutive), then the target should be to reduce the packet loss rate. This can be defined in several ways, for example:
The packet loss rate, after adaptation, should be less than X % (absolute threshold).
The packet loss rate, after adaptation, should be reduced by Y % (relative threshold).
If packet losses are consecutive, then the target should be to reduce the amount of consecutive losses.

It is also possible to define targets for the frame erasures. If the adaptation scheme contains transmission formats where the frame aggregation and/or redundancy is changed, then the target should be to reduce the frame erasure rate rather than the packet loss rate since FER is "neutral" with respect to frame aggregation and redundancy. The target can be defined in several ways, for example:
The frame erasure rate, after adaptation, should be less than X % (absolute threshold).
The frame erasure rate, after adaptation, should be reduced by Y % (relative threshold).
If frame erasures are consecutive, then the target should be to reduce the amount of consecutive frame erasures.

The system load and the channels vary both towards worse conditions and back to better conditions. In accordance with embodiments of the present invention, a solution for upwards adaptation is therefore needed in addition to the downwards adaptation that is described above.

If the VoIP client has no knowledge about the radio conditions, then the VoIP client does not know if the channel conditions improve such that larger packets can be sent. This is solved according to embodiments of the invention by testing if that is possible.

The testing is achieved by "probing" for a higher bit rate. The probing is done in a resilient way by maintaining a low coded mode rate but including more redundant frames in the packets. The packet size will then increase to a size similar to the size of the packets used in the original state.

For example: If AMR122 is used in the normal state, then the RTP packet size is typically 32 bytes when encapsulating 1 frame per packet. If one has adapted down to AMR59 and one frame per packet, then the RTP packet size is 16 bytes. The probing would then be done by encapsulating one new (non-redundant) speech frame and one redundant speech frame in the packet so that two frames are transmitted in each packet. The RTP packet size then becomes 32 bytes.

Figure 12:
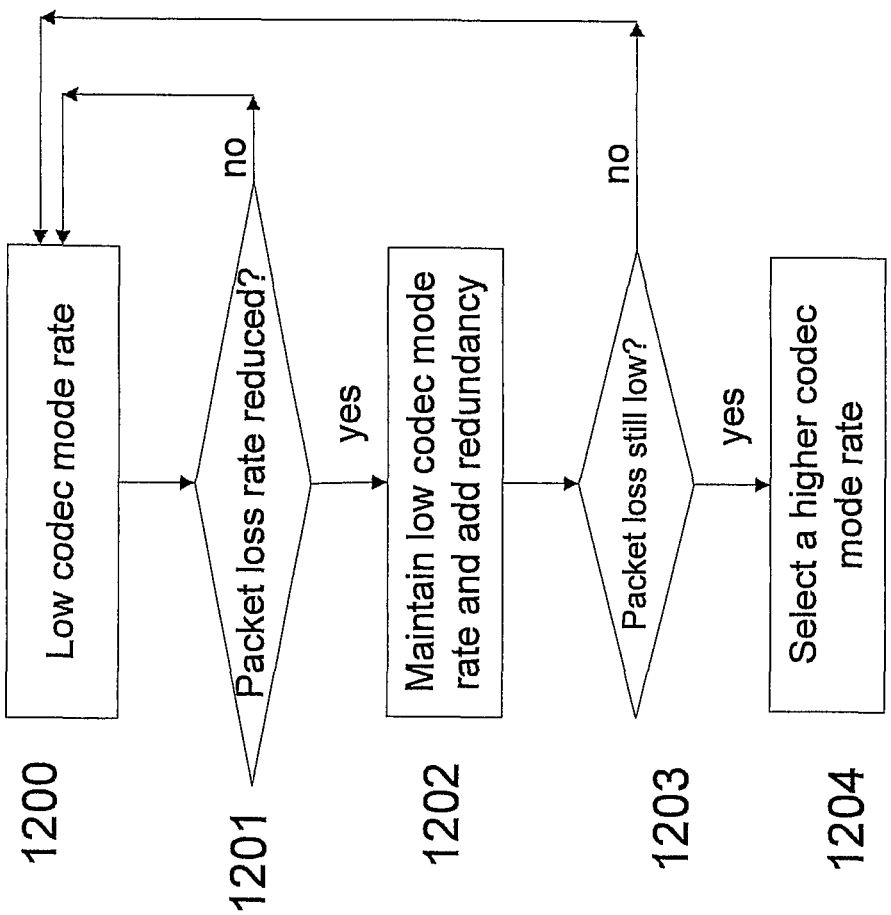
FIG. 12 is a flowchart of the method for performing upwards adaptation according to a further embodiment of the present invention.

An example of a solution for "upwards adaptation" is illustrated in a flowchart of FIG. 12:
1200. A state with a low codec mode rate is applied.
1201. Detect that the packet loss rate (or other metrics) has been significantly improved, i.e. performance has been improved.
1202. Maintain the low codec mode rate but add redundancy so that the packet size increases to the normal size.
1203. If the packet loss rate is still low, then switch to the higher codec mode rate.
1204. If the packet loss rate increases, then go back to the low codec mode rate state.

By using redundancy, it is possible to test if a higher bit rate is possible while still not jeopardizing the speech quality.

Since the downwards adaptation schemes are different for different systems, it is therefore preferred to test each one of them in a suitable order, as shown in this section. This order may be predetermined, or the order may be dynamic and depend on the characteristic of the transmission errors or on a target that determines the acceptable performance. Examples of how the pre-determined order is decided, in which the system-specific transmission schemes are tested, are:

Decided at the design phase, i.e. during the implementation.

Decided by the operator, i.e. when building the network.

Decided at call setup and then maintained throughout the session.

Decided at call setup but changed to another pre-determined order at handover (or cell change).

The performance of the pre-determined order may also be evaluated. For example by counting how many times the first tested adaptation scheme is the correct one to use. If one almost never stays in this state, then this is an indication that the pre-determined order is not appropriate and that it should be changed.

In order to achieve adaptation it is necessary to exchange information between the receiver and the transmitter relating to the available transmission schemes and the resulting performance of the transmission schemes. The information may be exchanged either by using inband signaling or by using out-of-band signaling. Inband signaling implies that some bits (or bytes) of information are embedded in the RTP (Real-time protocol) flow from the sender to the receiver. Out-of band signaling implies that the information is transmitted in separate packets, for example in RTCP (RTP Control Protocol) packets that are transmitted in parallel with the packets that contain the media.

In one embodiment of the invention inband signaling for this information exchange is used. For this purpose different inband signaling mechanisms are suggested according to embodiments of the present invention. This signaling is specified as requests, which means that there is no obligation for the receiving party to obey the requests. For instance, if the B-side of a session transmits some request to the A-side via inband signaling, it is a request that the A-side should encode and transmit the RTP stream from the A-side to the B-side in a specific way. The A-side does not need to follow the requests, for example if the format suggested by the request is deemed inappropriate for the specific access. It is however expected that the request will be followed in most cases, either by transmitting the media exactly as expected or with a transmission format that is similar to the requested format.

It is up to the sender of the requests to verify that the requests have been followed and also to take necessary actions based on the response to the requests.

The inband signaling mechanisms that are used in the example in the next section are:

CMR (Codec mode request): A request that is sent from one side to another with the purpose to increase or decrease the codec bitrate.

REQ_RED: An inband signaling that is used to request redundant transmission.

REQ_AGG: An inband signaling that is used to request frame aggregation.

Further, out-of-band signaling of the adaptation request may be performed by using RTCP APP (Real time Control Protocol Application Specific Packets) messages.

An exemplary implementation of the present invention will now be described. It should however be understood from the earlier discussion above that there also exist other means to implement the adaptation scheme, still lying within the scope of the present invention.

The described exemplary implementation of the present invention is described in conjunction with FIG. 7, where the inband signaling mechanisms are used.

It should be noted that the packet loss figures are just indicative and displayed just to make the understanding of the concept easier.

Below is a description of the states S1, S2, S2$a$, S2$b$, S3 and S4 shown in FIG. 7.

S1: S1 is a default state: Good channel conditions. In this case the highest codec rate and highest packet rate is used.

S2: In this state S2 the codec rate and possibly also the packet rate is reduced. This state is divided into 2 sub-states (S2$a$ and S2$b$). In state S2$a$ the codec rate is reduced. In state S2$b$ also the packet rate is reduced. State S2$a$ may also involve a gradual decrease of the codec-rate, in its simplest implementation it involves reducing the bit rate by a large amount, e.g. from AMR12.2 to AMR5.9.

S3: This is an interim state where a higher total bit rate and same packet rate as in S1 is tested in order to verify that it is possible to enter S1 later. This is accomplished by means of probed redundancy as described in conjunction with FIG. 12.

S4: In this state the codec rate is reduced and redundancy is turned on. Optionally also the packet rate is kept the same as in state S2.

The possible state transitions performed by using the inband signaling mechanism CMR are described below. It should be noted that there is preferably an implicit delay between state transitions in order to gather reliable statistics. This delay is typically in the order 100-200 frames. In this example it is assumed that packet loss is the metric used to determine the transition between is packet loss but it is possible to use other metrics such as lower layer channel quality metrics. Also some figures (5%, 2% etc) are mentioned, these values are only indicative and included just to make the reading easier.

Below are listed the possible state transitions and adaptation request signaling (CMR, frame aggregation or redundancy) that is involved.

S1→S2$a$: Condition for transition from S1 to S2$a$ is that the packet loss is greater or equal to 5% or that packet loss burst is detected. The codec rate is reduced (for example from AMR 12.2 to AMR 5.9) by means of a CMR (codec mode request).

S2$a$→S2$b$: Condition for transition from S2$a$ to S2$b$ is that the packet loss is greater or equal to 5%.

This state transition occurs if the packet loss is still high despite the reduction in codec rate. Packet rate is reduced by means of REQ_AGG.

S2$b$→S2$a$: Condition for transition from S2$b$ to S2$a$ is that the packet loss is less than 1%.

This state transition involves an increase of the packet rate. Also packet rate is restored to same value as in S1 by means of REQ_AGG. If the state transition S2$b$→S2$a$→S2$b$ occurs, the state will be locked to S2$b$ for some time, this time should be a random value in the value [Td1 . . . Td2] in order to avoid a large scale oscillating behavior.

S2$a$→S3: Condition for transition from S2$a$ to S3 is that the packet loss is less than 1%. Redundancy is turned on (100%) by means of adaptation request REQ_RED. Also packet rate is restored to same value as in State S1 by means of REQ_AGG.

S3→S2$a$: Condition for transition from S3 to S2$a$ is that the packet loss is greater or equal to 2% or that packet loss burst is detected.

The same actions as in the transition from S1→S2$a$ should be performed. If the transition S2$a$→S3→S2$a$→S3→S2$a$ occurs, the state S3 is disabled for some time, this time should be a random value in the value [Td1 . . . Td2] in order to avoid a large scale oscillating behavior.

S3→S1: Condition for transition from S3 to S1 is that the packet loss is less than 2% and that no packet loss burst is detected.

The redundancy is turned off by means of the adaptation request REQ_RED. Codec rate is increased by means of CMR.

S2b→S4: Condition for transition from S1 to S2a is that the packet loss is greater than or equal to 2%.

Redundancy is turned on (100%) by means of adaptation request REQ_RED. Also packet rate is restored to same value as in State S1 by means of REQ_AGG.

S4→S2: Condition for transition from S4 to S2 is that the packet loss is greater than or equal to 10%. This is indicative of that the total bitrate is too high.

Redundancy is turned off by means of adaptation request REQ_RED. State S4 is disabled for some time, this time should be a random value in the value [Td1 ... Td2] in order to avoid a large scale oscillating behaviour.

S4→S1: Condition for transition from S4 to S1 is that the packet loss is less than 1%.

Redundancy is turned off by means of adaptation request REQ_RED. Codec rate is increased by means of CMR.

S1→S4: Condition for transition from S1 to S4 is that the packet loss is greater or equal to 5% or that packet loss burst is detected AND the previous transition was S4→S1, otherwise the transition S1→S2a will be performed.

Redundancy is turned on (100%) by means of adaptation request REQ_RED. The codec rate is reduced (in the example from AMR 12.2 to AMR 5.9) by means of a CMR.

Figure 8:
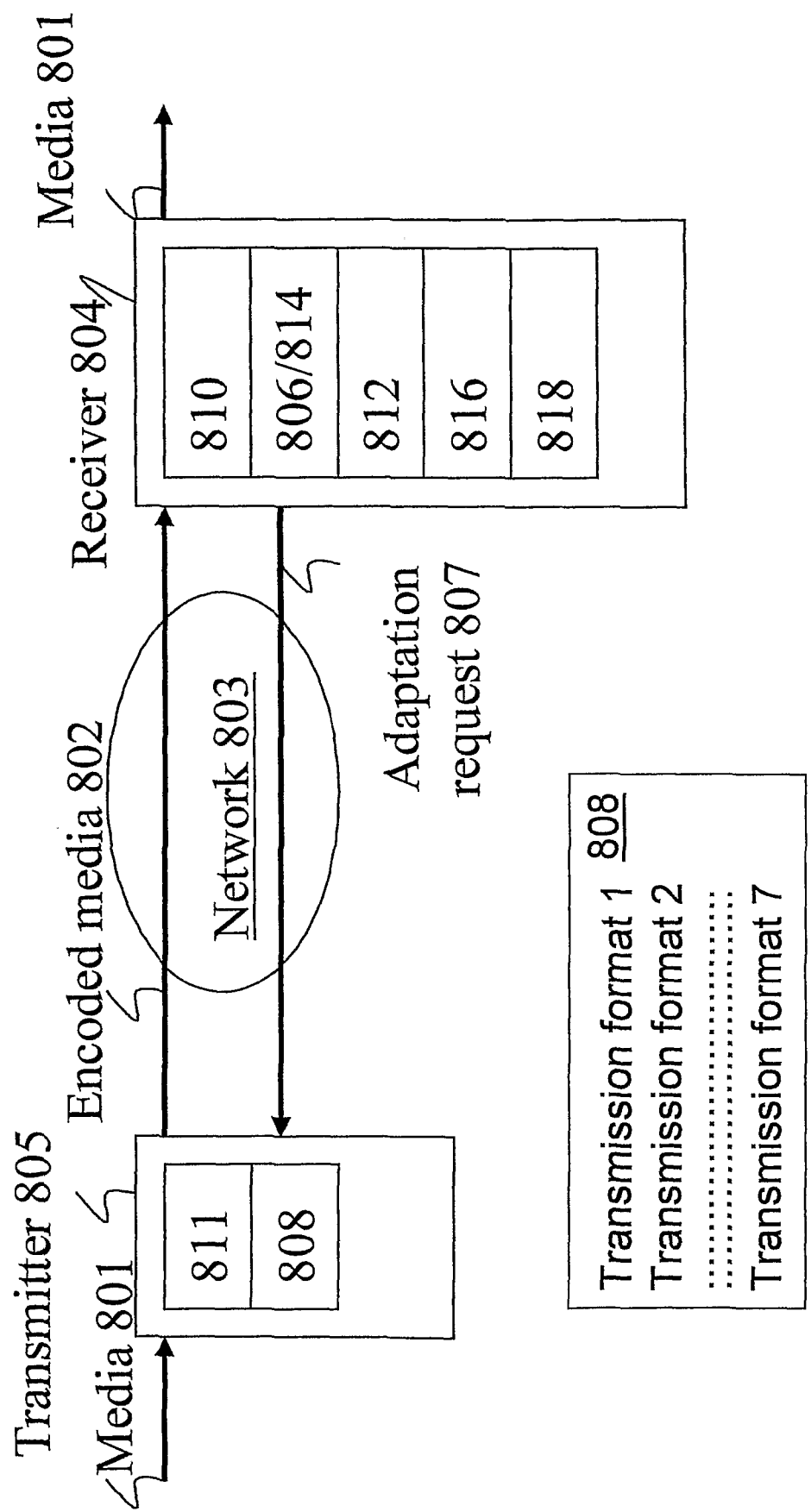
FIG. 8 shows one implementation where the adaptation control is implemented in the receiver according to one embodiment of the present invention.

A typical way to implement the present invention is to have the adaptation control in the receiver, as shown in FIG. 8.

Media 801 enters the transmitter 805 that encodes the media into encoded media 802 by the encoder 811. The encoded media is transmitted over a network 803 to the receiver 804 that decodes the media. In this case, the receiver 804 comprises a media performance analyzer 810 that is adapted to evaluate the performance of the received media, an adaptation controller 806 that is adapted to evaluate the performance of the received media based on target(s) 814 and to determine how to adapt, i.e. to select a suitable transmission format. The receiver further comprises a media decoder 812 and a storing unit 818 adapted to store information of the transmission formats that already have been tested.

It comprises hence output means 816 for sending an adaptation request message 807 such as CMR, REQ_RED, or REQ_AGG to the transmitter/encoder 805/811, which then preferably comprises a unit 808 storing the available transmission formats that is configured to change the transmission format of the encoding and the packetization of the media.

Figure 9:
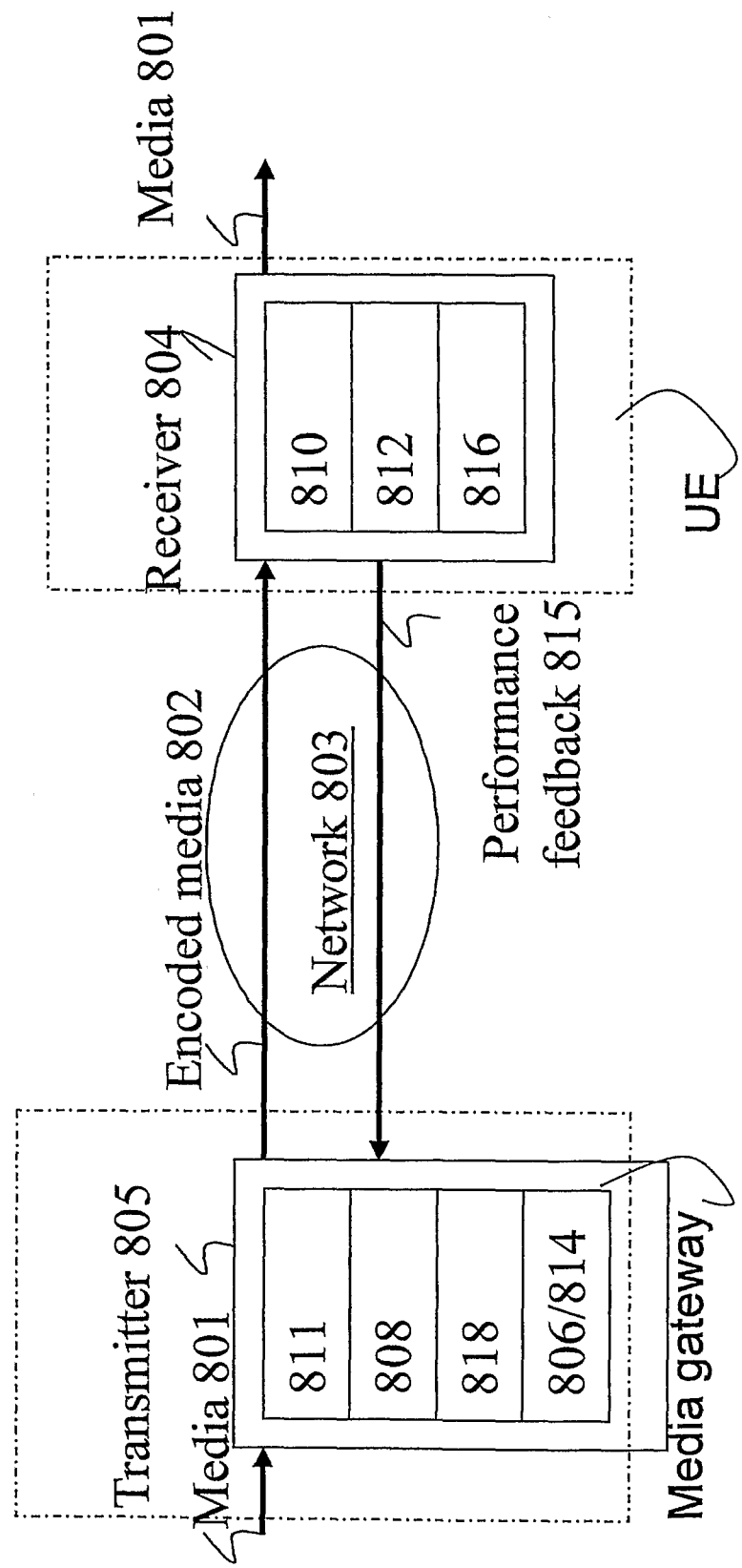
FIG. 9 shows one alternative implementation where the adaptation control is implemented in the transmitter according to one embodiment of the present invention.

It is however also possible to implement the adaptation control in the transmitter as shown in FIG. 9. As in the implementation of FIG. 8, media 801 enters the transmitter 805 that encodes the media into encoded media 802. The encoded media is transmitted over a network 803 to the receiver 804 that decodes the media.

In this case, the receiver 804 comprises a decoder 812, and media performance analyzer 810 that is configured to measure performance metrics such as: packet loss rate; packet loss burst metrics, frame erasure rate, delay jitter; etc. These metrics 815 are then transmitted to the transmitter/encoder 805/811 by means of an output means 816 with a back channel to the transmitter/encoder 805/811 such that the adaptation control 806 implemented in the transmitter can select a suitable transmission format based on the received performance metric and the target 814. Further, the receiver comprises preferably a storing unit 818 adapted to store information of the transmission formats that already have been tested.

Implementation of the adaptation control in the receiver results in that the signaling adaptation requests typically requires fewer bits than signaling metrics. Given the same allowed bandwidth for adaptation signaling, it is possible to send adaptation request signals more frequently compared with implementation of the adaptation control in the transmitter.

Figure 10:
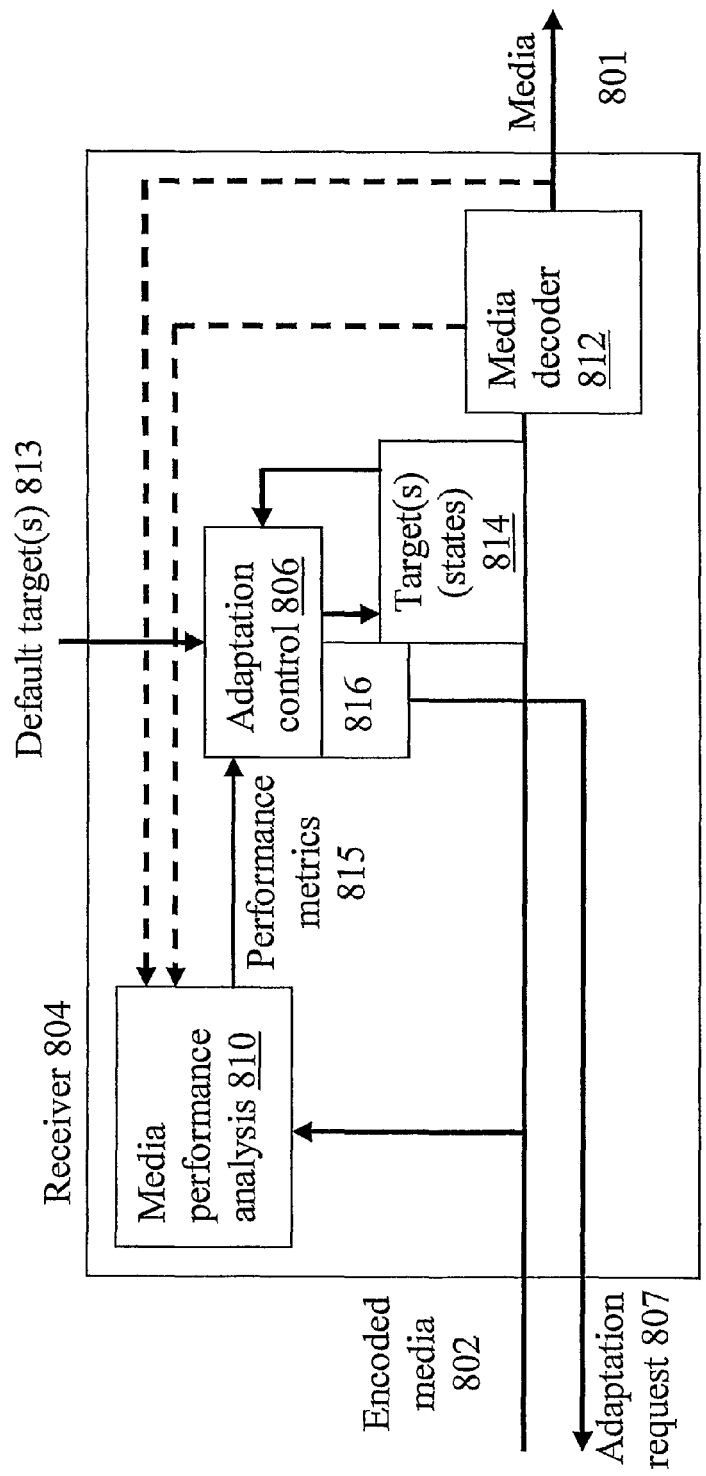
FIG. 10 shows the architecture in detail when the adaptation control is implemented in the receiver in accordance with one embodiment of the present invention.

A more detailed architecture of receiver for the case when the adaptation control is implemented in the receiver is shown in FIG. 10. The receiver 804 of FIG. 10 comprises a media performance analyzer 810, an adaptation controller 806, target(s) 814 and a media decoder 812. The media performance analyzer 810 analysis a performance metric 815 of the transmitted encoded media 802. The performance metric 815 is sent to the adaptation controller 806 that is configured to determine whether the performance metric fulfils a pre-determined target 814. The target is initially a default target 813 but may be changed based on the performance metric. If the performance metric(s) does (do) not fulfill the pre-determined target an adaptation request 807 is sent to the transmitter 805 to request a new transmission format by means of the output means 816. The media decoder 812 decodes the received encoded media to decoded media 801. As stated above the receiver may also comprise a storing unit 818 adapted to store information of the transmission formats that already have been tested. Such a unit is however not illustrated in FIG. 10.

As stated above, an embodiment of the present invention provides an upwards adaptation. Therefore, in accordance with this embodiment the performance analyzer 810 is configured to detect that a performance metric has been significantly improved. The adaptation controller 806 is configured to select a transmission format providing added redundancy to the transmission so that the packet size increases to the normal size, if the performance metric is still indicates good quality, then the adaptation controller 806 is configured to request a higher source codec bit rate and a less resilient transmission format, or if the performance metric indicate a reduced quality, then the adaptation controller 806 is configured to select the previous transmission format. In this case, the adaptation control may be implemented both in the transmitter and in the receiver.

The receiver 804 may be implemented in a mobile terminal and the transmitter 805 may be implemented in a media gateway as shown in FIG. 10 or/and the receiver 804 may be implemented in a media gateway and the transmitter 805 may be implemented in a mobile terminal.

Figure 11:
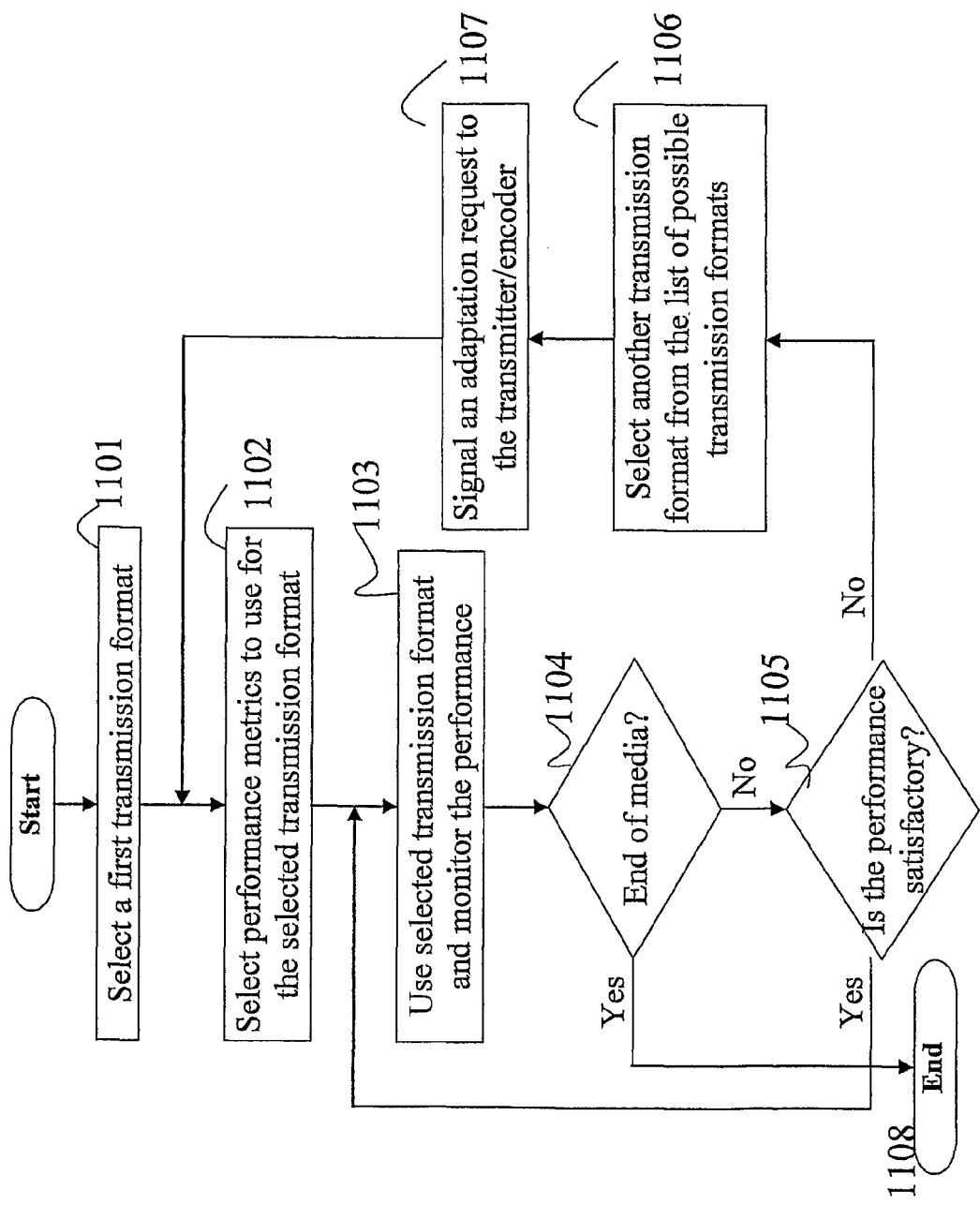
FIG. 11 is a flowchart of the method for performing downwards adaptation according to the embodiment when the adaptation control is implemented in the receiver.

An example flow chart of the functionality is shown in FIG. 11 when the adaptation control is implemented in the receiver. This flow chart only shows the back-off or down-wards adaptation toward schemes that loads the system less and/or provides more resilience against losses. The probing for higher bit rates is shown above in FIG. 12.

Step 1101. The encoded media is formatted according to either the normal scheme or according to a preceding adaptation request.

Step 1102. A set of performance metrics, one or several metrics, are selected. These performance metrics matches preferably the selected transmission format. It should be noted that this step is optional. If performance metric(s) is/are used that is/are neutral with respect to the transmission format, for example frame erasure rate (FER), then it is possible to use the same metric(s) for all transmission formats. If, on the other hand, metrics that are not neutral are selected, for example packet loss rate (PLR), then it is required to modify the metric(s) or at least the target(s) for the metric(s).

Step 1103. The performance of the received media is monitored and the performance compared with the targets for the performance metrics. The performance metrics are typically based on the received media, such as:

ξ Packet loss rate (PLR)
ξ Packet loss bursts metrics, for example: number (or percentage) of double losses (two losses in-a-row); number (or percentage) of triple losses (three losses in-a-row); etc. . . . The packet loss burst metrics may also include metrics for the distance between packet loss bursts.
ξ Delay jitter
ξ Frame erasure rate (FER) based on packet losses.
ξ Large amount of consecutive frame erasures.
ξ Measurements on channel quality, for example the CQI measurements that are used in HSDPA.
ξ Estimations on actual media quality (e.g. using evaluation of the quality of the synthesized (or generated) speech signal).
ξ BER in transmission blocks.

If more than one media is used in the service, combined metrics can be used. For example, if both voice and video is used in a multimedia communication service, the PLR/jitter/CQI/evaluation of the quality of the synthesized (or generated) speech signal observed for the speech can be used to adapt the video (because the voice is deemed more important for this specific service and context).

Step 1104-1105. The selected transmission format is preferably used as long as the performance exceeds the performance target. If the performance is degraded, which is detected when the performance metric(s) are below the target(s), then the adaptation scheme determines that one should try with another transmission format.

Step 1106. A new transmission format is selected from the list of transmission formats. The selection of the transmission format may or may not be an intelligent guess. Some formats may be specifically designed to handle some particular transport problems, for example a lot of consecutive losses. If this is detected, and if the suitable transmission format is not the next format in the list, then the adaptation may skip intermediate formats and jump directly to the format that is designed to handle the specific transport problem.

Step 1107. To change the transmission format the receiver/decoder has to signal an adaptation request to the transmitter/encoder, which then reconfigures the transmission to match the requested format.

It may be necessary to select new performance metrics that are suitable for the new transmission format. The necessity to select new metrics depends on what metrics which are used, for example:

The frame erasure rate (FER) is typically a good approximation of the quality. At the same time, the FER is also independent of how the media is packetized into the RTP packets.

When using the packet loss rate (PLR), one has to remember that the FER depends on how the media is packetized into the RTP packets. If one send 1 frame per packet then FER=PLR. If one send 2 frames per packet, without redundancy, then FER=2*PLR. If one use redundancy then the FER is much lower than the PLR (depending on the amount of redundancy and the packet loss distribution).

Step 1108. The processing continues until the end of the call.

The adaptation up-wards, towards higher bit rates and less resilience, is similar except that:

The performance metrics that one select for the scheme defines an upper performance threshold instead of a lower performance threshold. The upper threshold should normally not be exceeded unless the operating conditions are better than the conditions for which the used transmission format is designed to handle. If the upper threshold is exceeded then the adaptation selects a new transmission scheme that loads the system more.

First, one tries to load the system more by increasing the redundancy, so called redundancy probing. This scheme is specifically designed to load the system more, as much as the scheme that one will eventually adapt to if things work well, while still being resilient to the higher loss rates that may occur due to the higher load.

If this redundancy probing works well then one switch to the scheme that provides better quality, given that the packet loss rates are low, even though the resilience is reduced.

It should be noted that, in this case, the performance metrics that one use are those that match the transmission format that one will switch to, not the one that matches the redundancy probing format.

It should be understood that the disclosed implementation above is only an example of a variety of possible implementations of the present invention. The media may be video or audio in addition to voice (=speech). Furthermore, the disclosed transmission formats are only examples. Other systems may work better with other types of transmission formats.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for adapting transmission of encoded media in a packet-switched network to different operating conditions, where a plurality of transmission formats are available, said method comprising the steps of:
defining each transmission format to include a combination of at least two characteristics, wherein the at least two characteristics include frame aggregation, bit rate, or redundancy, wherein the redundancy includes a number of redundant frames per packet;
receiving information that indicates whether a performance metric of the transmitted encoded media fulfills a pre-determined target;
if the performance metric of the transmitted encoded media does not fulfill the pre-determined target, selecting another transmission format of the available transmission formats until the performance metric of the transmitted encoded media fulfils the pre-determined target, wherein the selecting another transmission format comprises randomly selecting another transmission format or selecting another transmission format according to a predetermined order;
detecting that the performance metric has been improved;
selecting added redundancy to the transmission so that a packet size increases to normal size, if the performance metric indicates good qualify, then
selecting a less resilient transmission format, or if the performance metric indicates a reduced quality, then
returning to the previous transmission format.

2. The method according to claim 1, wherein the performance metric is dependent on the parameters defined by the selected transmission format.

3. The method according to claim 1, wherein the redundancy comprises an offset redundancy.

4. The method according to claim 1, wherein a predetermined fall-back transmission format is selected if the performance metric of none of the available transmission formats fulfils the pre-determined target.

5. The method according to claim 1, wherein the method is implemented in a receiver.

6. The method according to claim 5, wherein the information whether a performance metric of the transmitted encoded media fulfils a predetermined target is received by:
analyzing the performance of the transmitted encoded media when a first selected transmission format is being used, and requesting the another selected transmission format of the available transmission formats from a transmitter.

7. The method according to claim 6, wherein the step of requesting another selected transmission format is performed by sending an adaptation request to the transmitter by using an inband signaling.

8. The method according to claim 6, wherein the step of requesting another selected transmission format is performed by sending an adaptation request to the transmitter by using an out of the band signaling.

9. The method according to claim 5, wherein the receiver is located in a terminal.

10. The method according to claim 5, wherein the receiver is located in a media gateway.

11. The method according to claim 1, wherein the method is implemented in a transmitter.

12. The method according to claim 11, wherein the method further comprises the step of applying the selected transmission format to the transmission of the encoded media.

13. The method according to claim 11, wherein the step of selecting another transmission format is performed by receiving a performance feedback from a receiver via inband signaling.

14. The method according to claim 11, wherein the step of selecting another transmission format is performed by receiving a performance feedback from a receiver via out of band signaling.

15. The method according to claim 11, wherein the transmitter is located in a terminal.

16. The method according to claim 11, wherein the transmitter is located in a media gateway.

17. The method according to claim 1, wherein the selecting another transmission format further includes determining a specific transport problem that is preventing the pre-determined target to be met and selecting another transmission format designed to specifically handle the specific transport problem.

18. A system for adapting transmission of encoded media in a packet-switched network to different operating conditions, where a plurality of transmission formats are available, said system comprising:
each transmission format including a combination of at least two characteristics, wherein the at least two characteristics include frame aggregation, bit rate, and redundancy, wherein the redundancy includes a number of redundant frames per packet;
an adaptation controller configured to receive information that indicates whether a performance metric of the transmitted encoded media fulfills a predetermined target, evaluate the performance of the received media based on the pre-determined target and select another transmission format if the performance metric of the transmitted encoded media does not fulfill the pre-determined target, wherein the selecting another transmission format comprises randomly selecting another transmission format or selecting another transmission format according to a predetermined order; and
a performance analyzer configured to detect that the performance metric has been improved, the adaptation controller is configured to select a transmission format providing added redundancy to the transmission so that a packet size increases to a normal size, if the performance metric indicates good quality, then the adaptation controller is configured to request a less resilient transmission format, or if the performance metric indicates a reduced quality, then the adaptation controller is configured to select a previous transmission format.

19. The system according to claim 18, wherein the performance metric is dependent on the parameters defined by the selected transmission format.

20. The system according to claim 18, wherein the redundancy comprises an offset redundancy.

21. The system according to claim 18, wherein the adaptation controller is configured to select a pre-determined fallback transmission format if the performance metric of none of the available transmission formats fulfils the pre-determined target.

22. The system according to claim 18, wherein the system is implemented in a receiver.

23. The system according to claim 18, further comprising a media performance analyzer configured to analyze the performance of the transmitted encoded media when a first selected transmission format is being used.

24. The system according to claim 18, wherein an output means is configured to request another transmission format by sending an adaptation request to a transmitter by using an inband signaling.

25. The system according to claim 18, wherein an output means is configured to request another transmission format by sending an adaptation request to a transmitter by using an inband signaling.

26. The system according to claim 22, wherein the receiver is located in a terminal.

27. The system according to claim 22, wherein the receiver is located in a media gateway.

28. The system according to claim 18, wherein the system is implemented in a transmitter.

29. The system according to claim 28, wherein the adaptation controller is configured to receive an analysis of the performance of the transmitted encoded media when a first selected transmission format is being used, and that the adaptation controller is configured to apply the selected transmission format to the transmission of the encoded media.

30. The system according to claim 28, wherein the adaptation controller is configured to receive a performance feedback from a receiver via inband signaling.

31. The system according to claim 28, wherein the adaptation controller is configured to receive a performance feedback from the receiver via out of band signaling.

32. The system according to claim 28, wherein the transmitter is located in a terminal.

33. The system according to claim 22, wherein a transmitter is located in a media gateway.

* * * * *

UNITED STATES PATENT AND TRADEMARK OFFICE
CERTIFICATE OF CORRECTION

Page 1 of 2

PATENT NO. : 8,422,382 B2
APPLICATION NO. : 12/438443
DATED : April 16, 2013
INVENTOR(S) : Johansson et al.

It is certified that error appears in the above-identified patent and that said Letters Patent is hereby corrected as shown below:

On the Title Page, in Item (57), under "ABSTRACT", in Column 2, Line 6, delete "formats is" and insert -- format is --, therefor.

In the Specification

In Column 2, Line 67, delete "formats is" and insert -- format is --, therefor.

In Column 4, Line 34, delete "formats is" and insert -- format is --, therefor.

In Column 6, Line 8, delete "redundancy" and insert -- redundancy. --, therefor.

In Column 6, Line 9, delete "3." and insert -- 3: --, therefor.

In Column 6, Line 18, delete "4." and insert -- 4: --, therefor.

In Column 6, Line 28, delete "rate" and insert -- rate. --, therefor.

In Column 6, Line 29, delete "aggregation" and insert -- aggregation. --, therefor.

In Column 6, Line 43, delete "rate" and insert -- rate. --, therefor.

In Column 7, Line 3, delete "redundancy" and insert -- redundancy. --, therefor.

In Column 7, Line 5, delete "twice)" and insert -- twice). --, therefor.

In Column 11, Line 25, delete "AND" and insert -- and --, therefor.

In Column 13, Line 5, delete "(PLR)" and insert -- (PLR). --, therefor.

Signed and Sealed this
Twenty-fourth Day of September, 2013

Teresa Stanek Rea
*Deputy Director of the United States Patent and Trademark Office*

CERTIFICATE OF CORRECTION (continued)
U.S. Pat. No. 8,422,382 B2

In Column 13, Line 11, delete "jitter" and insert -- jitter. --, therefor.

In the Claims

In Column 14, Line 57, in Claim 1, delete "qualify," and insert -- quality, --, therefor.

In Column 16, Line 39, in Claim 25, delete "inband signaling." and insert -- out of the band signaling. --, therefor.